United States Patent
Nacamuli (12)

(10) Patent No.: US 7,210,189 B2
(45) Date of Patent: May 1, 2007

(54) ARRANGEMENT INTRODUCED IN WIPER BLADE

(76) Inventor: Marc Nacamuli, Rua Bahia, 377 Apto 191, Higienopolis, Sao Paulo SP (BR)

( * ) Notice: Subject to any disclaimer, the term of this patent is extended or adjusted under 35 U.S.C. 154(b) by 0 days.

(21) Appl. No.: 11/203,812

(22) Filed: Aug. 15, 2005

(65) Prior Publication Data

US 2006/0037167 A1 Feb. 23, 2006

(30) Foreign Application Priority Data

Aug. 17, 2004 (BR) .................... 8402004 U (51) Int. Cl.
*B60S 1/38* (2006.01)
*B60S 1/40* (2006.01)

(52) U.S. Cl. .................. 15/250.201; 15/250.43; 15/250.32; 15/250.451

(58) Field of Classification Search .......... 15/250.201, 15/250.43, 250.32, 250.44, 250.451, 250.452
See application file for complete search history.

(56) References Cited

U.S. PATENT DOCUMENTS

| 6,523,218 | B1 * | 2/2003 | Kotlarski ............... 15/250.201 |
|---|---|---|---|
| 6,944,905 | B2 * | 9/2005 | De Block et al. ........ 15/250.201 |
| 2002/0053112 | A1 * | 5/2002 | Ohyama .................. 15/250.43 |
| 2002/0133897 | A1 * | 9/2002 | De Block et al. ........ 15/250.201 |
| 2003/0159229 | A1 * | 8/2003 | Weiler et al. .......... 15/250.201 |
| 2004/0010882 | A1 * | 1/2004 | Breesch ................. 15/250.201 |
| 2004/0098821 | A1 * | 5/2004 | Kraemer et al. ........ 15/250.201 |
| 2004/0111820 | A1 * | 6/2004 | Aoyama et al. ........ 15/250.201 |
| 2004/0181894 | A1 * | 9/2004 | Lee et al. .............. 15/250.201 |
| 2005/0172443 | A1 * | 8/2005 | Genet et al. ........... 15/250.201 |

FOREIGN PATENT DOCUMENTS

| GB | 2346318 | * | 8/2000 |
|---|---|---|---|
| JP | 2003-54383 | * | 2/2003 |
| WO | 02/42129 | * | 5/2002 |
| WO | 2004/076252 | * | 9/2004 |

* cited by examiner

*Primary Examiner*—Gary K. Graham
(74) *Attorney, Agent, or Firm*—Thomas A. O'Rourke; Bodner & O'Rourke, LLP (57) ABSTRACT

The present model refers to a wiper blade arrangement, wherein said blade acts on the surface of a windshield, said blade having a blade body formed as a single piece by welding, bonding, fitting or coextrusion of two different profiled materials, resulting in a single body having a curved shape throughout its length to allow uniform distribution of the load applied by the arm of the wiper. The blade and the arm are joined together by a sequential central support, made of metallic or plastic material, or, alternatively, by an enclosing central support, joining the blade body through a metal vertebra. The blade body has alternative constructive arrangements in its upper region, having a symmetric or asymmetric spoiler, as well as an alternative constructive arrangement with no spoiler at all, but only a convex bulging, leading to improved distribution of the airflow on the blade.

9 Claims, 7 Drawing Sheets

ARRANGEMENT INTRODUCED IN WIPER BLADE

This model refers to an arrangement introduced in a windshield wiper blade, particularly to automotive windshield wipers, provided with a curved shape, having the profile of its body formed as a single piece, consisting of two different materials joined together by welding, bonding, fitting or coextrusion, the profile being used as a support of the metal vertebra and the rubber element.

Additionally, the model discloses constructive alternative arrangements to the windshield wiper blade body and to the coupling central support of said blade to the wiper arm.

DESCRIPTION OF THE PRIOR ART

Several constructive arrangements introduced in windshield wipers blades are known in the current art.

One of the main features to be checked in this type of equipment refers to the blade curvature in contact with the windshield, as well as its placement during movement.

Several devices have been developed to adapt the rubber element to the windshield curvature. Typically, the blade body, supporting the rubber element, consists in at least two different components, joined together using several means, resulting in assemblies comprising an excessive number of parts and locking means between them. Additionally, several metal components are employed.

For example, we can mentioned the mechanism of patent GB593775 disclosing an arrangement in windshield wiper blade where the rubber element is directly secured to a flat spring body supporting it, shaping said rubber element, along its length, to the windshield curvature. The assembly consisting in the rubber element and the flat spring is directly secured to the wiper arm by connection means, for example, a locking pin. This arrangement in blade has a limited curvature control, since it includes rigidly joined elements, not meeting the requirements of effective cleaning, even because the load distribution is not uniform along the complete length of the assembly in contact with the windshield.

U.S. Pat. No. 3,192,551, for instance, discloses an arrangement in windshield wiper blade where several different flexible frame models may be used, to which the blade rubber is coupled, so that the assembly is adapted to the windshield curvature and more evenly distributes the pressure exerted by the blade on the windshield surface. The solution proposed in this document indicates that a flexible frame with a fixed or varying width or even a fixed or varying thickness along its length can be used so as to better distribute the load on the windshield surface. In this arrangement, the blade body is formed by joining the flexible frame (accommodating the blade rubber by fitting) with a central connection riveted to the frame that, in turn, is directly coupled to the wiper arm. Alternatively, the rubber is rigidly joined to the flexible frame.

The curvature control required to the blade for high performance is very difficult to reach in blades using several components rigidly coupled to each other, thus impairing the uniform distribution of the rubber element load on the windshield.

Another disadvantage of the current art blades relates to possible noises occurring during the vehicle movement that may cause a certain discomfort to the vehicle passengers and occurring due to the cavities on the assembly components.

So as to solve the current art drawbacks, this model shows a novel constructive arrangement provided with a blade body formed as a single piece by welding, bonding, fitting or coextrusion of two different profiled materials, resulting in a single body with a curved shape throughout its length, thus allowing a uniform and optimized load distribution by the wiper arm. The blade body may have spoilers of different constructive arrangements that favor the aerodynamic action on the blade and prevent undesired effects of the airflow on it.

Besides, this model shows a decreased number of components all over its structure, thus facilitating the product mounting. Also, as a result of its low and completely closed profile, a decreased noise level caused by the wind is obtained due to the decreased number of components and surfaces exposed to wind currents.

Another advantage of this model relies on the fact that it has improved strength against the strict winter conditions due to the lack of metal components and joints that allow the formation and concentration of ice.

Additionally, due to the new connection systems, this product can be used in a number of applications presented in catalogs to the conventional system widely used nowadays and also in windshield wipers blades having a similar configuration.

SUMMARIZED DESCRIPTION OF THE DRAWINGS

This model will be better described based on the attached drawings, in which.

DETAILED DESCRIPTION OF THE MODEL

Figure 1:
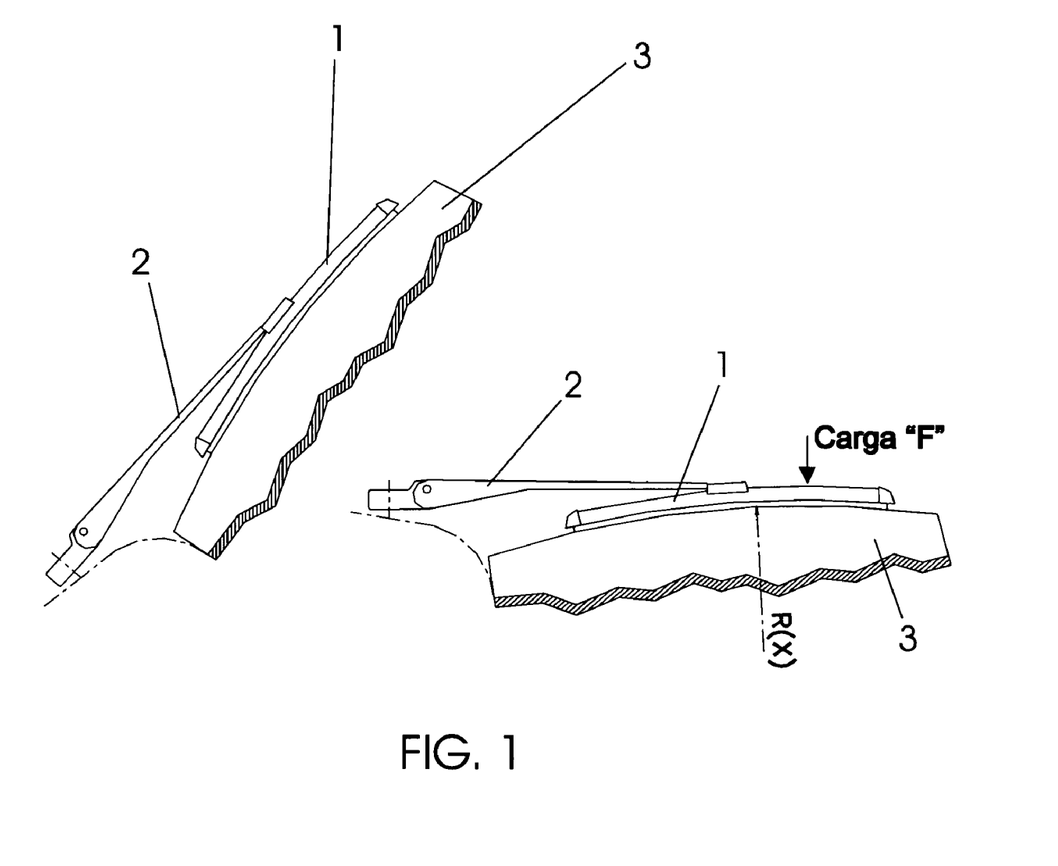
FIG. 1 is a schematic view of a wiper arm with a blade operating on a windshield, the windshield radius of curvature being viewed.

Referring to the attached FIGS., it is seen in FIG. 1 that the present model discloses a blade (1) of the windshield wiper, secured to an arm (2) of the wiper, where said blade (1) acts on the surface of a windshield (3).

The curved shape throughout its length allows an optimized distribution of the load "F" applied by the arm (2) of the wiper. This distribution should remain uniform throughout the surface covered by the blade (1) when actuating it, regardless of the windshield surface (3) geometry, the non-uniform radius of curvature of which is showed in FIG. 1 by R (X).

Figure 2:
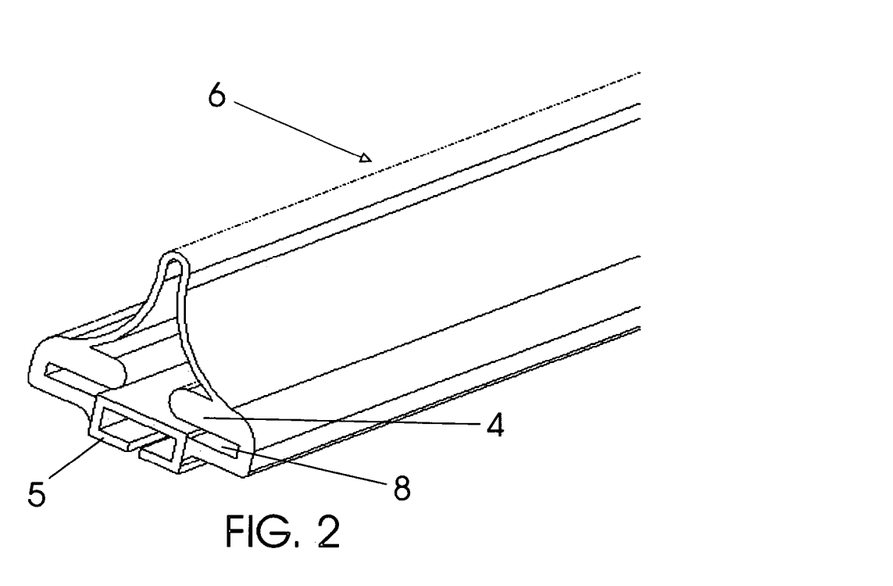
FIG. 2 is a partially sectioned perspective view of the blade body profile, object of this model.

In FIG. 2, it is seen that the blade has a blade body (6) formed as a single piece by welding, bonding, fitting or coextrusion of two different profiled materials, where coextrusion consists in joining two profiles that, at a certain time in the process, are melted between the pre-determined contact surfaces so as to generate a single body. The profile of said blade body (6) consists in an upper support (4), made of flexible material, and a lower support (5), made of semi-rigid material. Joining the upper (4) and the lower (5) supports, for example, by coextrusion, assures the formed single piece a support to the other components of the blade system (1), including the metal vertebra (7) and the rubber element (9).

The upper support (4) has a mounting channel (8), passing lengthwise throughout the length of the blade body (6), being preferably rectangular in shape, inside of which the metal vertebra (7) is inserted, also having preferably rectangular and flat profile and shape, being used for securing and keeping the element (9) in uniform contact with the windshield (3).

The present model shows three constructive variants for the blade body (6) that will be detailed with reference to FIGS. 3, 4 and 5.

Figure 3:
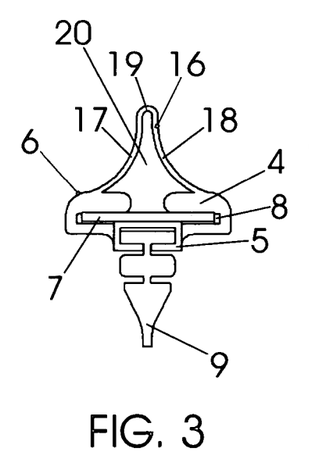
FIG. 3 is a sectioned view of a first constructive alternative of the blade body, provided with a symmetric spoiler on its upper portion.

FIG. 3 shows a first constructive alternative for the blade body profile (6), where the upper support (4) of the blade body (6) has, in its upper portion, a symmetric spoiler (16) consisting in concave curved elements (17,18), joined together by an upper vertex (19) having a rounded profile, the interior of said symmetric spoiler (16) configuring a chamber (20).

Figure 4:
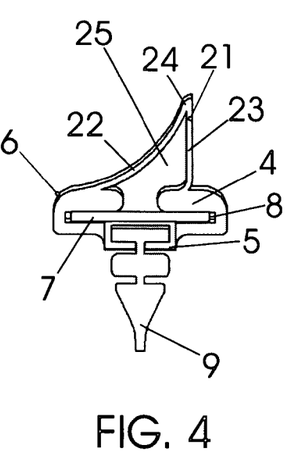
FIG. 4 is a sectioned view of a second constructive alternative of the blade body, provided with an asymmetric spoiler on its upper portion.

A second constructive alternative for the blade body profile (6) is showed in FIG. 4, where the upper support (4) of the blade body (6) has, in its upper portion, an asymmetric spoiler (21), consisting in a concave curved element (22) and a vertical wall (23), joined together by an upper vertex (24) of rounded profile, the interior of said asymmetric spoiler (21) configuring a chamber (25).

Figure 5:
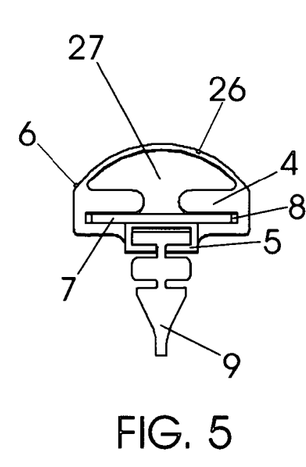
FIG. 5 is a sectioned view of a third constructive alternative of the blade body, not provided with a spoiler on its upper portion.

FIG. 5 shows a third constructive alternative for the blade body profile (6), where the upper support (4) of the blade body (6) has, in its upper portion, a no-spoiler profile, consisting in only a convex bulging (26), the interior of said bulging (26) configuring a chamber (27).

Figure 6:
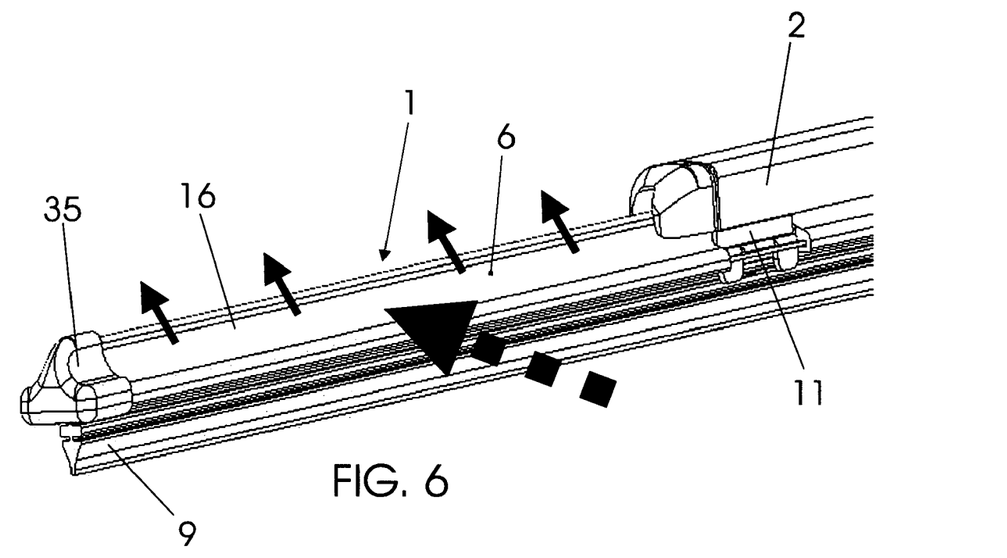
FIG. 6 is a partial schematic perspective view of the windshield wiper assembly, indicating the aerodynamic action of the blade body with symmetric profile, thus preventing the wiper from loosing contact with the windshield surface during its operation.

FIG. 6 schematically shows the aerodynamic action of the blade body (6), in this example with the symmetric spoiler (16), where the dashed arrow indicates the airflow on the blade. In all cases, due to the aerodynamic profile of the blade body (6), regardless of the spoiler profile in use, an excellent cleaning quality of the windshield (3) may be obtained when the vehicle is at high speed, also avoiding the so-called "Wind-Lift" effect that makes the wiper to lose contact with the windshield surface (FIG. 6).

Figure 7:
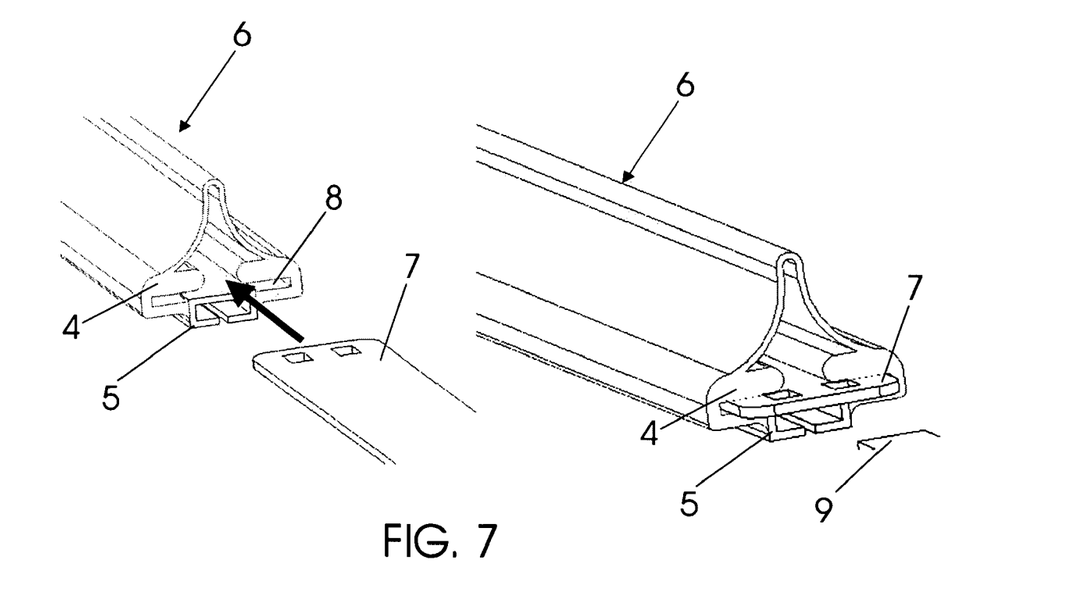
FIG. 7 is a partially detailed perspective view of the blade body and the metal vertebra to be inserted inside it, showing the mounting of said vertebra inside the mounting channel.

In FIG. 7, it is seen that the upper support (4) supports and accommodates in its mounting channel (8), throughout its length, the metal vertebra (7), even following its curvature under any loading condition on the blade (1). The metal vertebra (7) is inserted lengthwise inside the mounting channel (8), as showed in FIG. 7 (index arrow).

Figure 8:
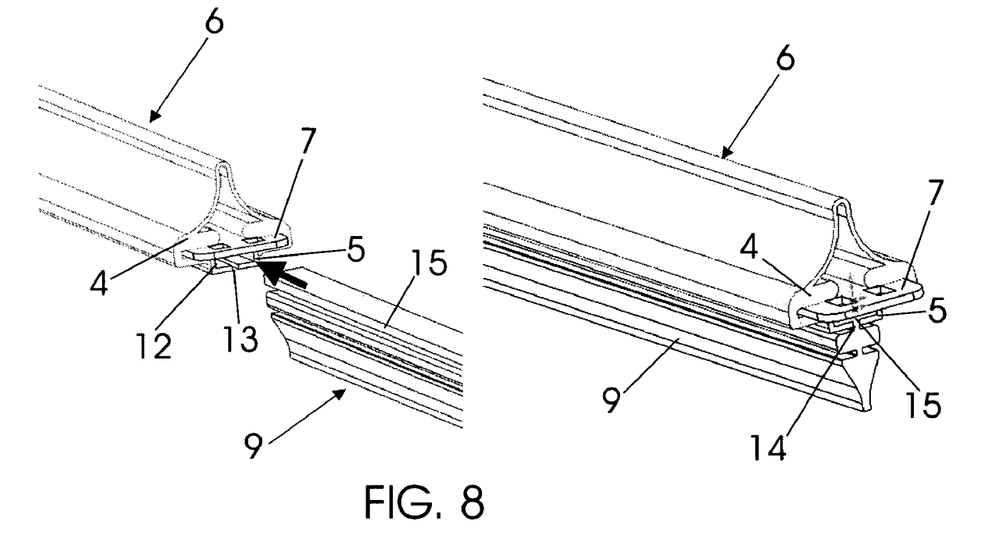
FIG. 8 is a partially detailed perspective view of the blade body and the metal vertebra inserted inside it, inside the mounting channel, depicting the rubber element mounting, blade component of this model.

Likewise, FIG. 8 depicts the rubber element mounting (9), the blade component of the present model, inside the lower support (5) of the blade body (6).

The lower support (5) has a lower mounting channel (12), passing lengthwise throughout the length of the blade body (6), being preferably rectangular in shape and further provided with a longitudinal rectangular opening (13) extending throughout the blade body (6), in which the rubber element (9) is inserted through the rectangular section (14). Like this, the rectangular upper section (15) of said element (9) is inserted in the lower mounting channel (12), supporting said element (9) together with the blade body (6). Said rubber element (9) is intended to remove the water and particles from the windshield (3) in a homogeneous and effective manner.

The lower support (5) supports the complete length of the rubber element (9) and also follows the curvature of the metal vertebra (7) under any loading condition on the blade (1), assuring its support.

Figure 9:
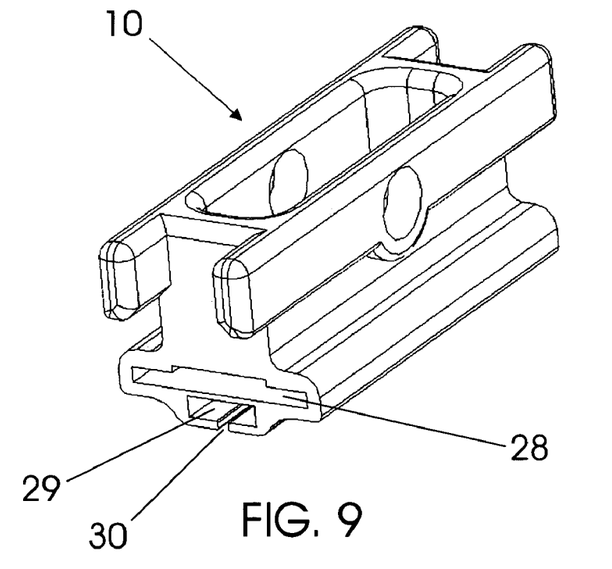
FIG. 9 is a perspective view of a first constructive alternative for the blade central support.

The present constructive arrangement further comprises a first constructive alternative for the sequential central support (10), showed in FIG. 9, comprising a metallic or plastic material, the function of which is to be adjusted to the adapter of arm (2) of the windshield wiper (3), allowing the appropriate movement as required, in addition to transmit load "F" from arm (2) of the wiper to the blade (1) of the windshield wiper (3).

The sequential central support (10) has a mounting channel (28), passing lengthwise throughout the length of the central support (10), being preferably rectangular in shape, inside of which the metal vertebra (7) is inserted.

Figure 10:
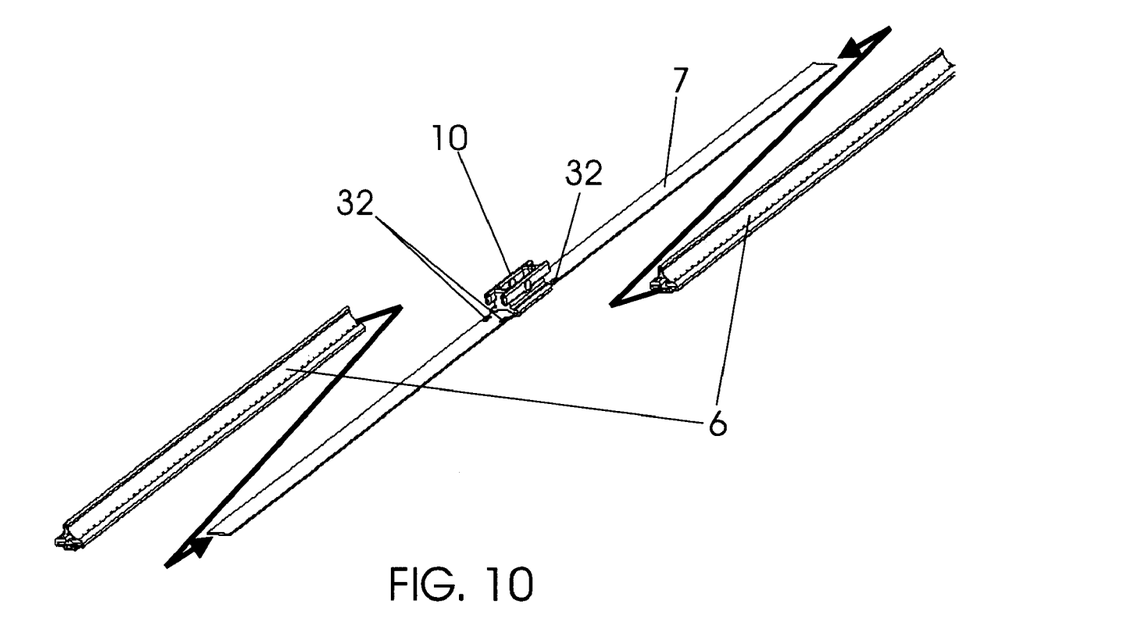
FIG. 10 is a perspective view depicting the blade body and the metal vertebra mounting sequence in the central support of FIG. 9.

FIG. 10 depicts the mounting sequence of body (6) of the blade and the metal vertebra (7) in the sequential central support (10).

The main feature of the sequential central support (10) is the metal vertebra (7) mounting by the mounting channel (28), generally locking it in its central region by means of a plastic pin or riveting. The region of the lower base of the support (10) has a passage channel (29) of the rubber element (9), passing lengthwise throughout the length of the central support (10), being preferably rectangular in shape and further provided with a longitudinal rectangular opening (30) extending throughout the central support (10), in which the rubber element (9) is inserted through the rectangular section (14). Like this, the upper section (15) of said element (9) is inserted into the passage channel (29), so as to support the profile of the rubber element (9).

By using this sequential central support (10), the profiles of the blade body (6) should be mounted by means of the two ends of the metal vertebra (7), after inserting and positioning said vertebra (7) in the mounting channel (28), as showed in FIG. 10. Thus, the blade body (6) is split, each half being mounted from one end of the metal vertebra (7).

Figure 11:
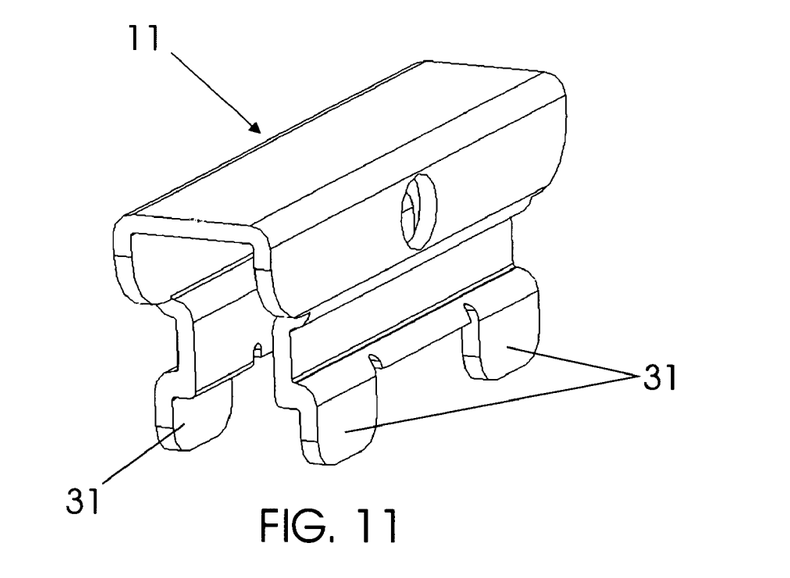
FIG. 11 is a perspective view of a second constructive alternative for the blade central support.

According to FIG. 11, the present constructive arrangement further comprises a second constructive alternative for the central support, where the enclosing central support (11) may be used as an alternative to the sequential central support (10), being provided with preferably rectangular positioning guides (31), positioned perpendicularly to the plane of the metal vertebra (7) and engaging into rectangular openings (32) equally positioned in the central region of the metal vertebra (7). Said enclosing central support (11) is mounted on the metal vertebra (7) over the blade body profile (6), having a longitudinal cutout (33) allowing communication between the central support (11) and the vertebra (7), that are locked by the abovementioned processes.

Figure 12:
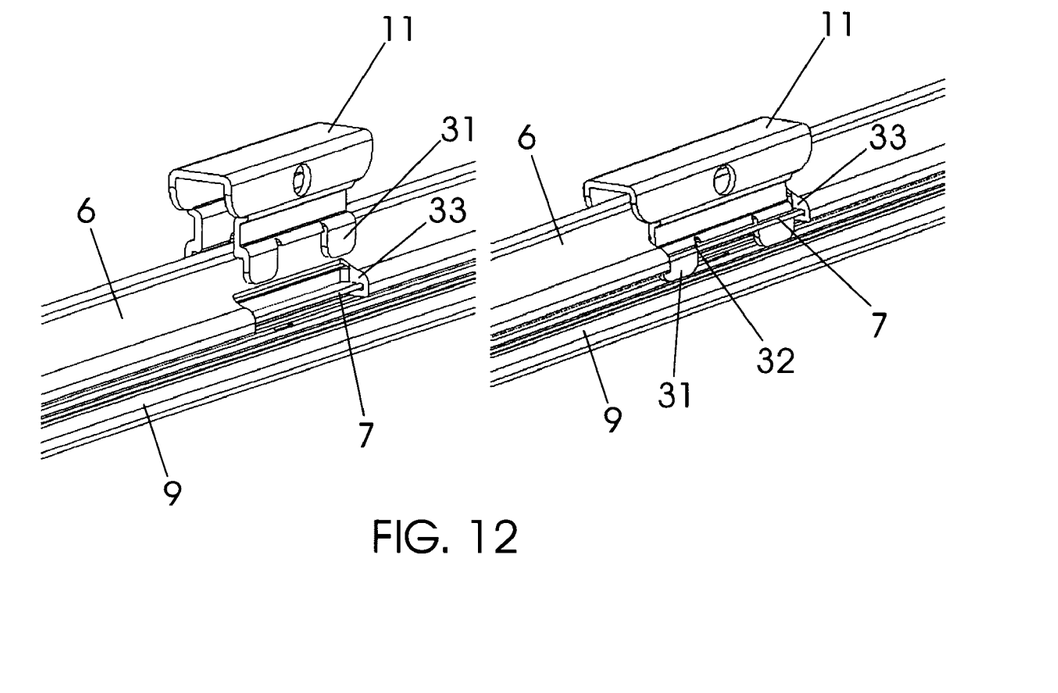
FIG. 12 is a perspective view depicting the central support mounting sequence of FIG. 11 in the blade body and the metal vertebra coupled.

FIG. 12 discloses the mounting sequence of the enclosing central support (11) in the blade body (6) and the metal vertebra (7) previously coupled. Locking of the assembly by joining the enclosing central support (11) and the metal vertebra (7) is clearly seen, being positioned through guides (31) and openings (32).

Figure 13:
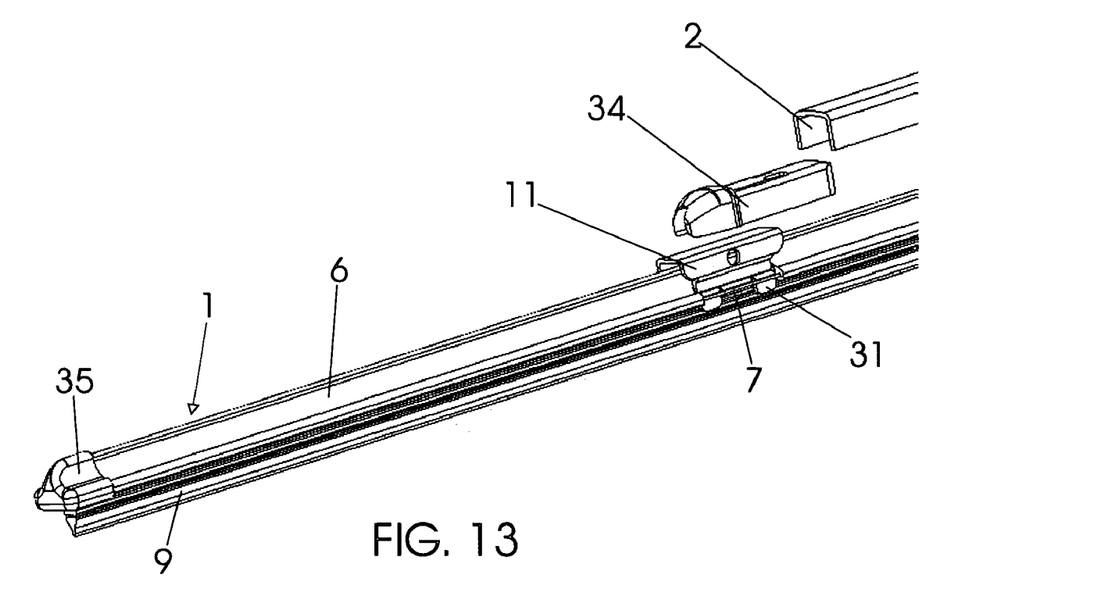
FIG. 13 is a partial perspective view depicting the blade arm mounting in the central support of FIG. 11.
Figure 14:
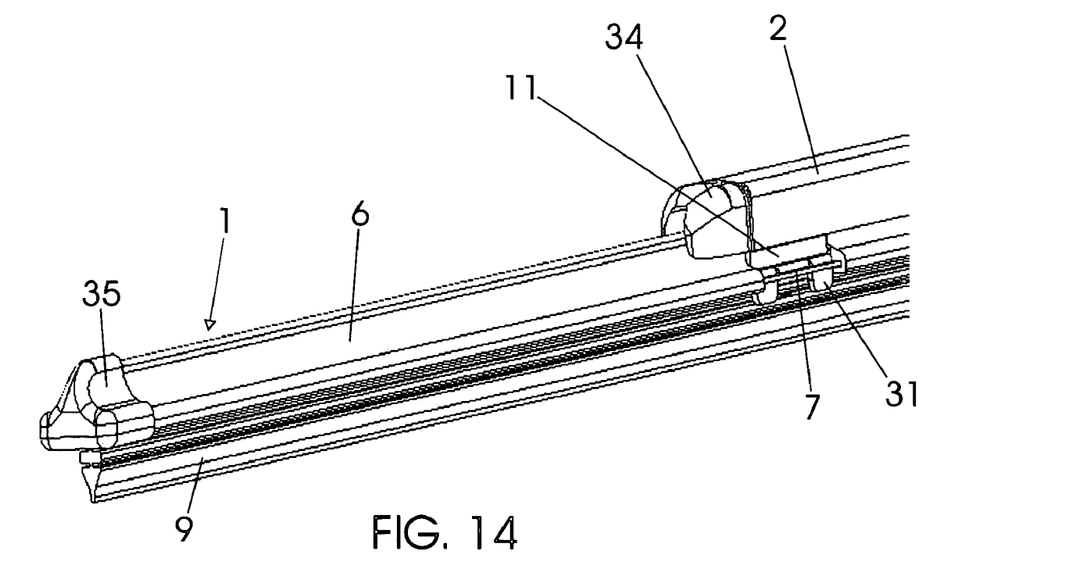
FIG. 14 is a partial perspective view of the assembly consisting in the blade arm, the central support, the blade body, the metal vertebra and rubber element, all of them being mounted.

FIGS. 13 and 14 show a mounting example using an enclosing central support (11), where all components of the constructive arrangement are coupled to arm (2) of a windshield wiper using an adapter (34) intended to secure the blade (1) to arm (2) with no clearances and to allow free or partial rotation of the blade (1). The blade body (6) and the rubber element (9) are secured using tips (35), further encasing possible cuttings edges of the metal vertebra (7).

It should be emphasized that the central support used, whether of the sequential (10) or encasing (11) types, may have several arrangements or configurations in its upper region, so that it can be applied to several types of adapters. Therefore, the present constructive arrangement and its alternatives may be used in several types of adapters. An arrangement for securing said central support to the adapter must not be a limiting factor or the object of the present model.

The invention claimed is:

1. An improved wiper blade assembly comprising:
a first blade body and a second blade body, a metal vertebra, a rubber element and a central support used for connecting said blade bodies to an oscillating arm, each of said blade bodies having an upper support and a lower support, each of said upper supports having a mounting channel, said mounting channel being sized and shaped to receive said metal vertebrae, said mounting channel extending longitudinally through the upper support of each of said blade body, said lower support of each blade body being sized and shaped to receive a top portion of said rubber element, said central support being secured to said metal vertebrae and located between said first and second bodies; and
wherein said mounting channel of each of said upper supports is generally rectangular in shape having a top surface being defined by two opposing generally oval arms extending toward each other and a bottom surface.

2. The improved wiper blade assembly according to claim 1, wherein each of said upper supports of said first and second blade bodies has a symmetric spoiler profile, said spoiler profile having a first and second curved portion said first and second curved portions being joined together by an upper vertex having a rounded profile.

3. The improved wiper blade assembly according to claim 2, wherein said symmetric spoiler profiles have an interior defining a chamber.

4. The improved wiper blade assembly according to claim 1, wherein each of said upper supports of said first and second blade bodies have an asymmetric spoiler profile, said spoiler profiles each having a curved portion and a vertical portion each of said portions and said vertical portions being joined together by an upper vertex having a rounded profile.

5. The improved wiper blade assembly according to claim 4, wherein said asymmetric spoiler profiles have an interior defining a chamber.

6. The improved wiper blade assembly according to claim 1, wherein each of said upper supports of said first and second blade bodies has a convex bulge.

7. The improved wiper blade assembly according to claim 6, wherein each convex bulge has an interior defining a chamber.

8. The improved wiper blade assembly according to claim 7, wherein each said lower support is also generally rectangular in shape having a top surface and a bottom surface, each said top surface and bottom surface being connected by two opposing sidewalls, each said bottom surface having a slit wherein said top portion of said rubber element is in contact with said slits.

9. The improved wiper blade assembly according to claim 8, wherein said central support has an opening extending from one side thereof to an opposite side thereof for receiving said metal vertebrae.

* * * * *